(12) United States Patent
Hong

(10) Patent No.: US 6,545,698 B2
(45) Date of Patent: Apr. 8, 2003

(54) MOBILE VIDEO TELEPHONE WITH AUTOMATIC ANSWERING FUNCTION AND METHOD FOR CONTROLLING THE SAME

(75) Inventor: Chung-Seon Hong, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/973,528

(22) Filed: Oct. 9, 2001

(65) Prior Publication Data

US 2002/0085087 A1 Jul. 4, 2002

(30) Foreign Application Priority Data

Dec. 29, 2000 (KR) ........................................ 2000-86175

(51) Int. Cl.$^7$ ................................................ H04N 7/14
(52) U.S. Cl. ................................ 348/14.02; 348/14.06; 455/575; 379/67.1
(58) Field of Search ........................ 348/14.01, 14.02, 348/14.03, 14.04, 14.05, 14.06, 14.07, 14.08, 14.09; 455/567, 565, 569, 575, 557; 379/67.1; H04N 7/14

(56) References Cited

U.S. PATENT DOCUMENTS 5,425,102 A  *  6/1995  Moy .......................... 713/183

FOREIGN PATENT DOCUMENTS

| JP | 407170506 A | * | 7/1995 | ............ H04N/7/14 |
| JP | 407254920 A | * | 10/1995 | ............ H04M/1/00 |
| JP | 410304420 A | * | 11/1998 | ............ H04Q/7/14 |
| JP | 1054563 A1 | * | 11/2000 | ............ H04N/7/14 |

* cited by examiner

Primary Examiner—Melur Ramakrishnaiah
(74) Attorney, Agent, or Firm—Dilworth & Barrese, LLP

(57) ABSTRACT

A mobile video telephone with an automatic answering function is provided for sending a distinct outgoing message to a specified person. The mobile video telephone comprises a camera for taking a photograph of a calling person; a memory for storing a password, a video message, a basic message and a hint message; an image processor for compressing image data taken by the camera and decompressing image data received from a counterpart mobile video telephone; and a display for displaying the image data received from the counterpart mobile video telephone and also for displaying an operating status of the mobile video telephone. Further, the mobile video telephone comprises an alarm for generating a ring tone distinguishable from a normal ring tone, upon receipt of an incoming call from a specified person.

11 Claims, 4 Drawing Sheets

MOBILE VIDEO TELEPHONE WITH AUTOMATIC ANSWERING FUNCTION AND METHOD FOR CONTROLLING THE SAME

This application claims priority to an application entitled "AUTOMATIC ANSWERING MACHINE IN A VIDEO PHONE AND METHOD FOR CONTROLLING THE SAME" filed in the Korean Industrial Property Office on Dec. 29, 2000 and assigned Serial No. 2000-86175, the contents of which are hereby incorporated by reference.

BACKGROUND OF THE INVENTION

1. Field of the Invention

The present invention relates generally to a mobile video telephone with an automatic answering function, and in particular, to a mobile video telephone with an automatic answering function capable of sending a distinct video message to a specified person and a method for controlling the same.

2. Description of the Related Art

An automatic answering service is frequently used when one cannot answer an incoming call for various reasons. For example, in the case of a wire-based telephone, the automatic answering service is chiefly used when the telephone user is absent from a place where the telephone is installed. However, in the case of a mobile telephone, the automatic answering service is chiefly used when the telephone user cannot answer an incoming call because, for example, he or she is in conference or is at a public place such as a music hall or a theater.

However, in the case of the conventional mobile telephone, the automatic answering service is managed by the telephone system, so that the telephone user may hear uniform messages provided from the system.

SUMMARY OF THE INVENTION

It is, therefore, an object of the present invention to provide a mobile video telephone with an automatic answering function, capable of sending a distinct outgoing message to a specified person and a method for controlling the same.

To achieve the above and other objects, there is provided a mobile video telephone with an automatic answering function. The mobile video telephone comprises a camera for taking a photograph of a calling person; a memory for storing a password, a video message, a basic message and a hint message; an image processor for compressing image data taken by the camera and decompressing image data received from a counterpart mobile video telephone; and a display for displaying the image data received from the counterpart mobile video telephone and also for displaying an operating status of the mobile video telephone. Further, the mobile video telephone comprises an alarm for generating a ring tone distinguishable from a normal ring tone, upon receipt of an incoming call from a specified person.

Upon receipt of an incoming call, the mobile video telephone determines whether an automatic answering mode is set. If the automatic answering mode is set, the mobile video telephone sends a basic automatic answering screen including a password input request message. Upon receipt of a password, the mobile video telephone determines whether the received password is identical to a previously registered password. If the passwords are identical to each other, the mobile video telephone sends a video message associated with the password.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
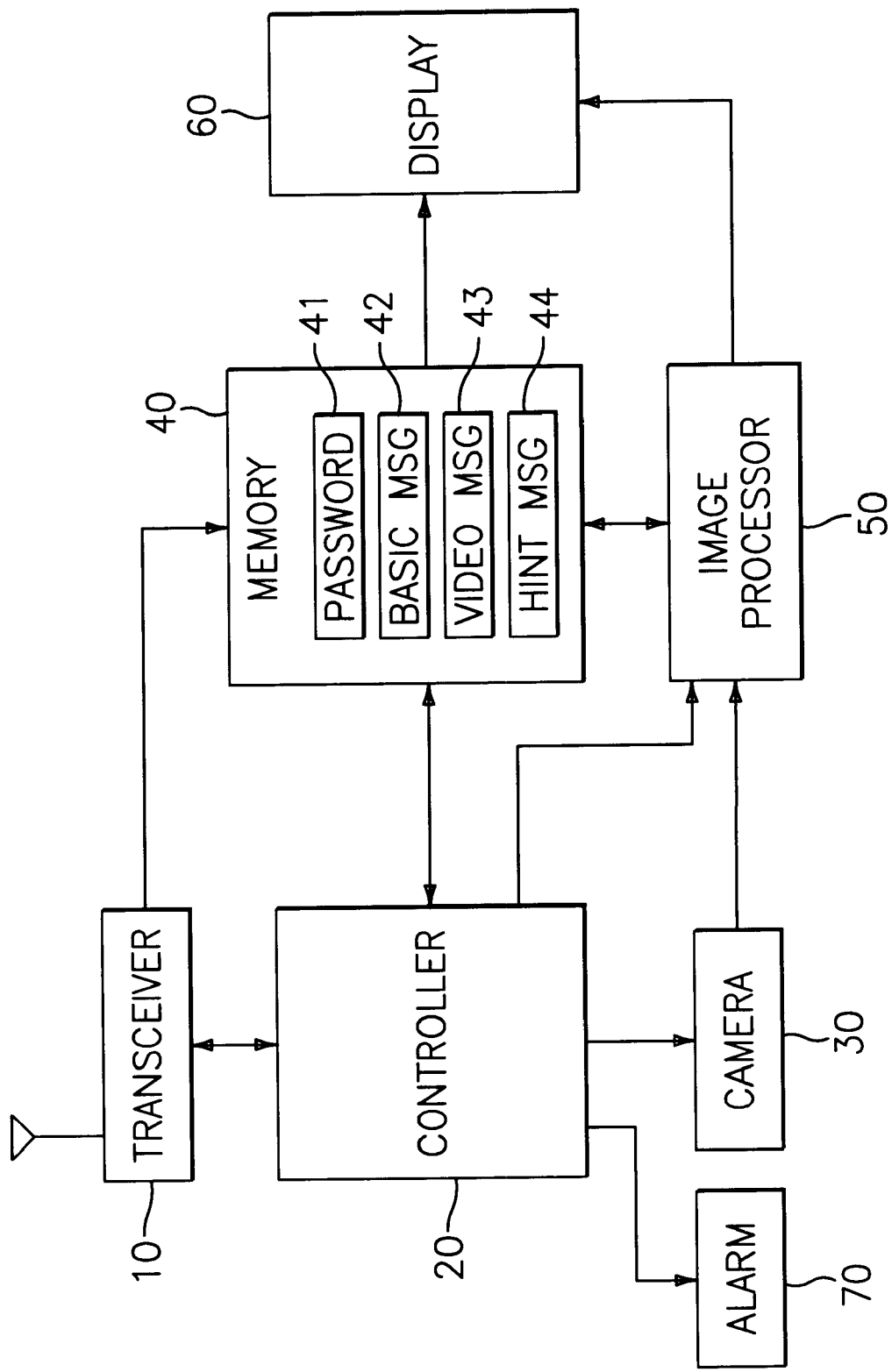
FIG. 1 is a block diagram illustrating a mobile video telephone with an automatic answering function according to an embodiment of the present invention.

FIG. 1 illustrates a mobile video telephone with an automatic answering function according to an embodiment of the present invention.

Referring to FIG. 1, a transceiver 10 transmits and receives radio signals through an antenna connected thereto. A controller 20 controls the overall operation of the mobile video telephone, and a camera 30 takes a photograph of a subject, for example, a calling person, under the control of the controller 20. The camera 30, for which a CCD (Charge Coupled Device) camera is typically used, is mounted in the mobile video telephone. A memory 40 stores a password 41, a basic message 42, an automatic answering video message 43, and a hint message 44. An image processor 50 compresses image data provided from the camera 30 according to a standard moving picture compression technique (e.g., MPEG4). The image processor 50 also decompresses the compressed image data received from the counterpart mobile video telephone. A display 60 displays the image data from the image processor 50 and also displays an operating status of the mobile video telephone. An alarm 70 generates a ring tone upon receipt of an incoming call to inform the user of receipt of the incoming call. In an automatic answering mode, the alarm 70, under the control of the controller 20, generates a distinct ring tone distinguishable from a normal ring tone, to inform the user of receipt of an incoming call from a specified person.

Figure 2:
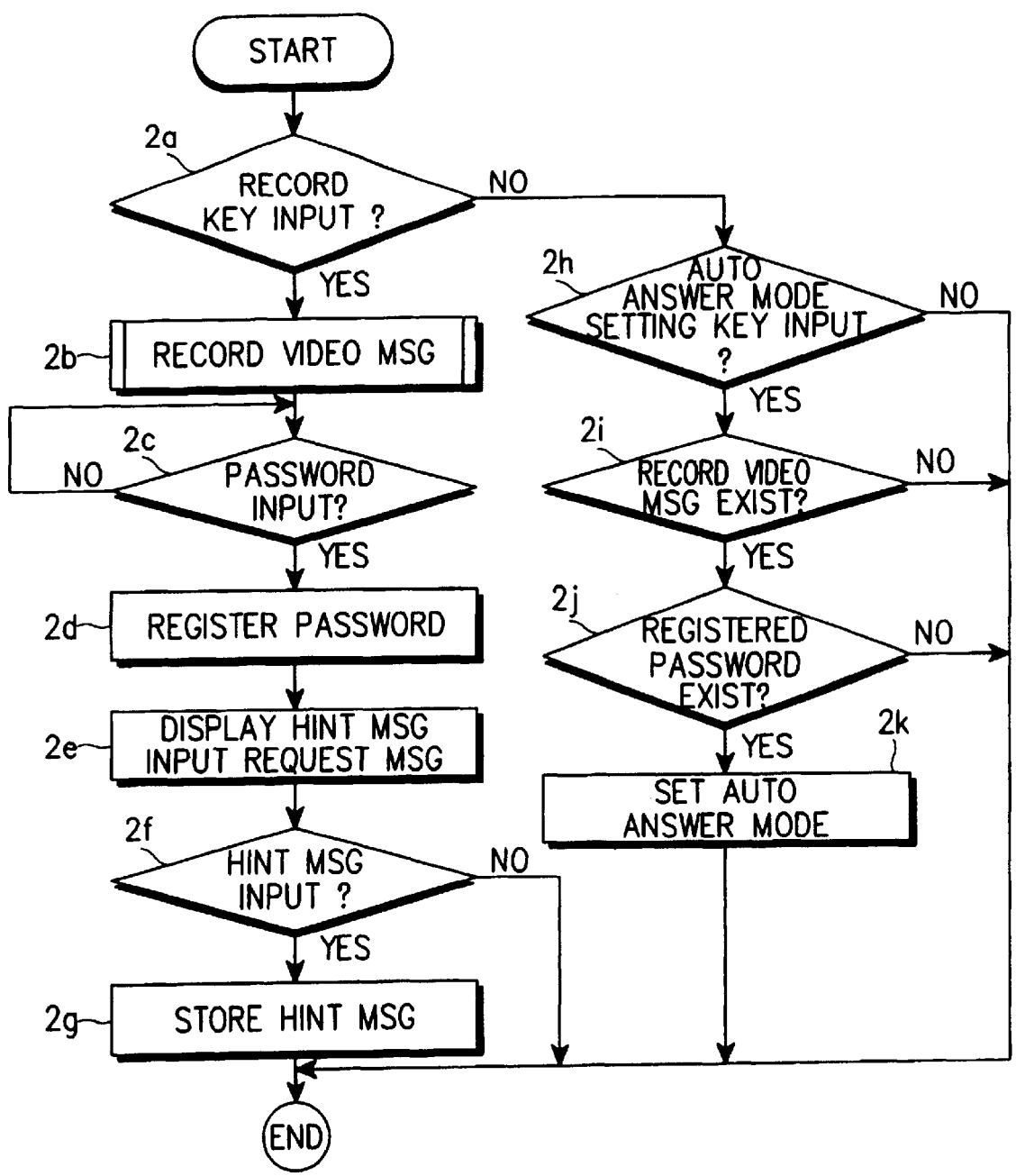
FIG. 2 is a flow chart illustrating a procedure for setting an automatic answering mode in the mobile video telephone with the automatic answering function according to an embodiment of the present invention.

FIG. 2 illustrates a procedure for setting an automatic answering mode in the mobile video telephone with the automatic answering function according to an embodiment of the present invention.

Referring to FIG. 2, the controller 20 determines in step 2a whether an automatic answering video message record key is input (or pressed). If the automatic answering video message record key is input, the controller 20 records a moving image to be restrictively provided to only a specified person, in step 2b. Thereafter, in step 2c, controller 20 determines whether a specific key (or password) is input. If the specific key is input, the controller 20 registers the input specific key or password in the memory 40 as the password 41, in step 2d. Subsequently, in step 2e, the controller 20 displays on the display 60 a character message requesting the user to input a hint message. If the hint message is input by the user in step 2f, the controller 20 stores the hint message in the memory 40 in step 2g.

However, if it is determined in step 2a that the automatic answering video message record key is not input, the controller 20 determines in step 2h whether an automatic answering mode setting key is input. If the automatic answering mode setting key is input, the controller 20 determines in step 2i whether there exists any moving image recorded for the automatic answering service in the memory 40. If there exists the recorded moving image, the controller 20 determines in step 2j whether there exists a password registered in the memory 40. If the password is registered in the memory 40, the controller 20 sets the automatic answering mode by setting a predetermined flag, in step 2k. The process can be repeated any number of times to create a database.

Figure 3:
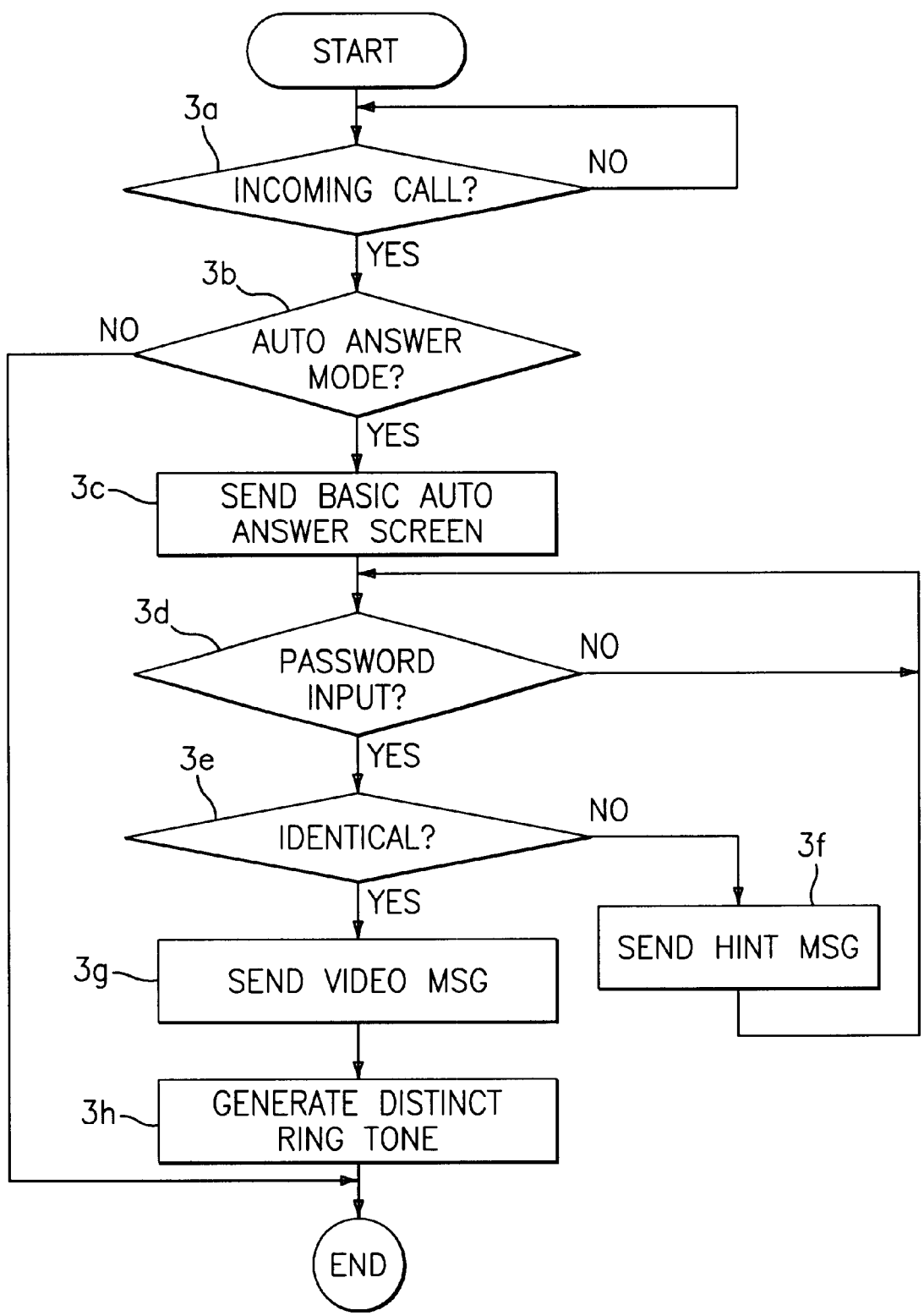
FIG. 3 is a flow chart illustrating a procedure for receiving an incoming call in the mobile video telephone with the automatic answering function according to an embodiment of the present invention.

FIG. 3 is a flow chart illustrating a procedure for receiving an incoming call in the mobile video telephone with the automatic answering function according to an embodiment of the present invention.

Referring to FIG. 3, the controller 20 determines in step 3a whether an incoming call is received. Upon receipt of the incoming call, the controller 20 checks a status of the predetermined flag in step 3b to determine whether the automatic answering mode is set. If the automatic answering mode is set, the controller 20 transmits a basic automatic answering screen including a password input request message in step 3c. For example, the controller 20 may transmit a moving image with a basic automatic answering message (or video message) requesting the other party to press a predetermined key in order to see an additional message. Alternatively, the controller 20 may transmit a character message "I cannot answer your call at the moment. Please, press a password to leave a message". Here, the "password" refers to a predetermined combination of two or more access keys (including numeric keys and alphabet keys). If a combination (e.g., 7238 or ghk69) of numeric and alphabet keys is set as a password for a "family message" which should be transmitted only between family members, the controller 20 will transmit the family message upon receipt of the corresponding password.

Upon receipt of the password in step 3d, the controller 20 determines in step 3e whether the password 41 registered in the memory 40 is identical to the received password. If they are not identical to each other, the controller 20 transmits a hint message 44 in step 3f. The hint message is used when the user forgets the password. For the hint message, an anniversary such as a wedding anniversary or a birthday can be used, which the user can easily remember.

Otherwise, if the passwords are identical to each other, the controller 20 transmits the video message in step 3g. In the foregoing case, the controller 20 transmits the family message. In step 3h, the controller 20 activates the alarm 70 to inform the user that the specified person has accessed the mobile video telephone. In this case, the alarm 70 generates a distinct ring tone distinguishable from the normal ring tone.

Figure 4:
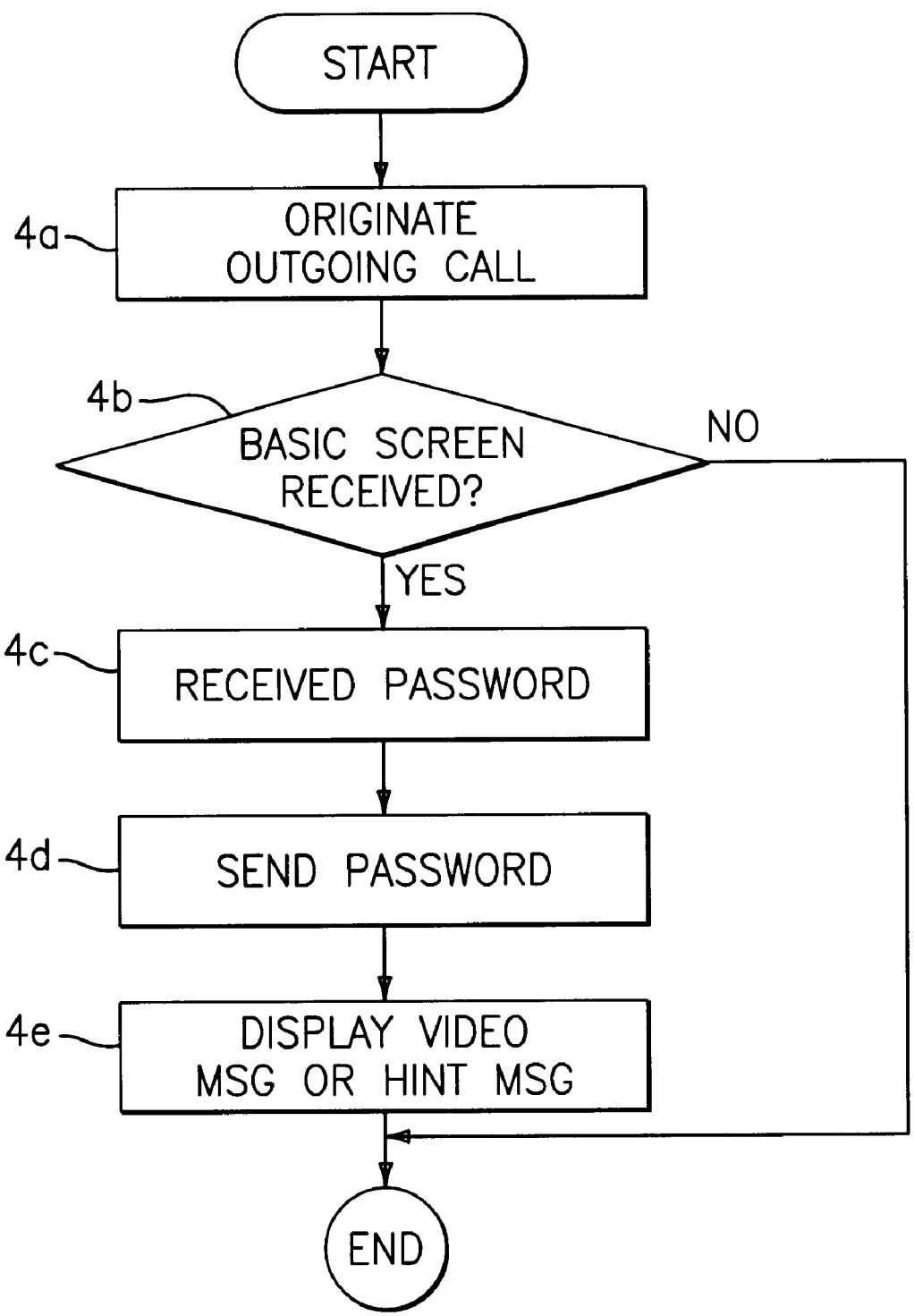
FIG. 4 is a flow chart illustrating a procedure for originating an outgoing call in the mobile video telephone with the automatic answering function according to an embodiment of the present invention.

FIG. 4 illustrates a procedure for originating an outgoing call in the mobile video telephone with the automatic answering function according to an embodiment of the present invention.

Referring to FIG. 4, the controller 20 originates an outgoing call in step 4a, and determines in step 4b whether a basic automatic answering screen including a password input request message is received. Upon receipt of the basic screen, the controller 20 receives a password that the user has input at the sight of the basic screen, in step 4c. The controller 20 transmits the received password in step 4d, and then displays a video message received from the counterpart mobile video telephone on the display 60 in step 4e. The counterpart mobile video telephone transmits the video message, when the user input password is identical to the registered password. Otherwise, when the user input password is not identical to the registered password, the counterpart mobile video telephone will transmit the hint screen. In this case, the controller 20 of the originating mobile video telephone will display the hint screen received from the counterpart mobile telephone in step 4e.

As described above, the mobile video telephone according to the present invention can provide its own particular automatic answering service. Therefore, the mobile video telephone can restrictively send a distinct video message to a specified person, when the telephone user cannot receive an incoming call.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile video telephone with an automatic answering function comprising:

a camera for recording video messages for automatic answering;

a memory for storing a basic video message for automatic answering, a password for distinguishing a specified person, a special video message corresponding to the password, and a hint message for providing a hint of the password to the specified person;

an image processor for compressing image data taken by the camera and decompressing image data received from a counterpart mobile video telephone; and a display for displaying the image data received from the counterpart mobile video telephone and for displaying an operating status of the mobile video telephone;

wherein upon a call connection in an automatic answering mode, a controller displays the basic video message for automatic answering on the display, and then displays at least a portion of the special video message corresponding to the password input by the specified calling person on the display.

2. The mobile video telephone as claimed in claim 1, further comprising an alarm for generating a ring tone distinguishable from a normal ring tone, upon receipt of an incoming call from a specified person.

3. A method for setting an automatic answering mode in a mobile video telephone with an automatic answering function, the method comprising the steps of:

(a) determining whether an automatic answering image record key is input;

(b) recording a moving image to be transmitted to a specified person, when the automatic answering image record key is input;

(c) after completion of recording the moving image, determining whether a password to be assigned to the specified person is input; and (d) upon receipt of the password, storing the password so that the specified person and the recorded moving image are matched in a memory.

4. The method as claimed in claim 3, further comprising establishing a database wherein steps (a) to (d) are repeated to store a plurality of passwords in the memory in association with corresponding video messages.

5. The method as claimed in claim 3, further comprising the steps of:
   determining whether an automatic answering mode setting key is input;
   if the automatic answering mode setting key is input, determining whether the memory has any recorded video message and its associated password; and
   setting the automatic answering mode, if the memory has a video message and its associated password.

6. The method as claimed in claim 3, further comprising the steps of:
   after storing the password, displaying a hint message input request message on a display; and
   upon receipt of a hint message, storing the received hint message in the memory.

7. A method for performing an automatic answering service in a mobile video telephone with an automatic answering function having at least one memory stored password and corresponding video message, the method comprising the steps of:
   upon receipt of an incoming call, determining whether an automatic answering mode is set;
   sending, if the automatic answering mode is set, a basic automatic answering screen including a password input request message to a calling person;
   upon receipt of a password from the calling person, determining whether the received password is identical to a previously stored password; and
   sending, if the passwords are identical to each other, a video message corresponding to the stored password.

8. The method as claimed in claim 7, further comprising the step of sending a hint screen, if the passwords are not identical to each other.

9. The method as claimed in claim 7, further comprising the step of generating a ring tone distinguishable from a normal ring tone, after sending the video message.

10. A method for originating an outgoing call in a mobile video telephone with an automatic answering function, the method comprising the steps of:
    originating the outgoing call to a counterpart mobile video telephone with the automatic answering function;
    determining whether a basic automatic answering screen including a password input request message is received from the counterpart mobile video telephone;
    upon receipt of the basic automatic answering screen, inputting a password that is previously stored in the counterpart mobile video telephone, and sending the input password; and
    receiving a video message corresponding to the password from the counterpart mobile video telephone with the automatic answering function, and displaying the received video message on a display, if the input password is identical to a registered password in the counterpart mobile video telephone.

11. The method as claimed in claim 10, further comprising the step of displaying a hint message received from the counterpart mobile video telephone, when the input password is not identical to the password registered in the counterpart mobile video telephone.

* * * * *